C. E. BURNETT.
VEHICLE BODY SUPPORT.
APPLICATION FILED APR. 27, 1917.
1,319,042.
Patented Oct. 21, 1919.
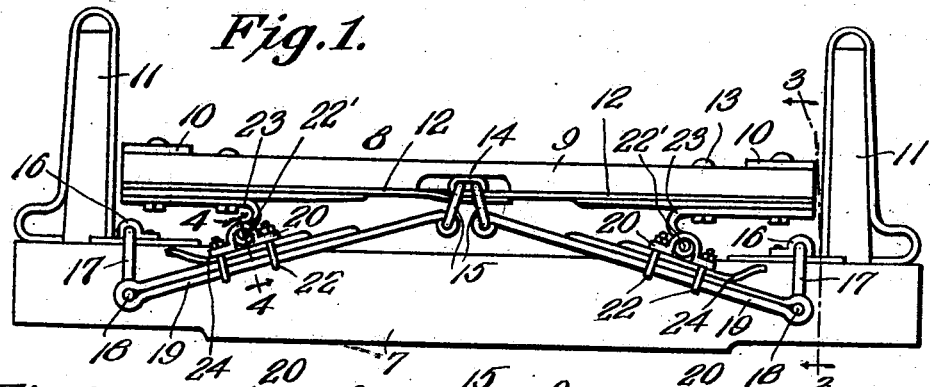
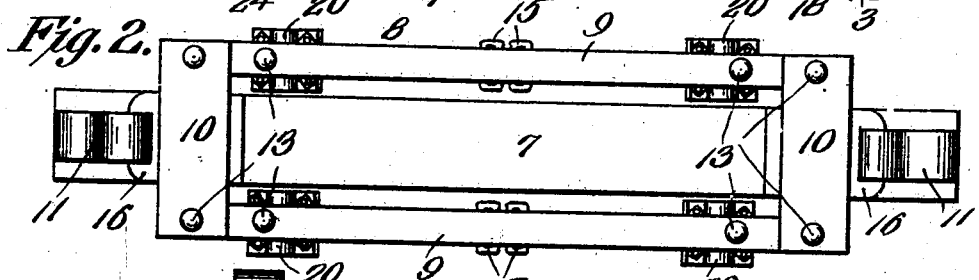
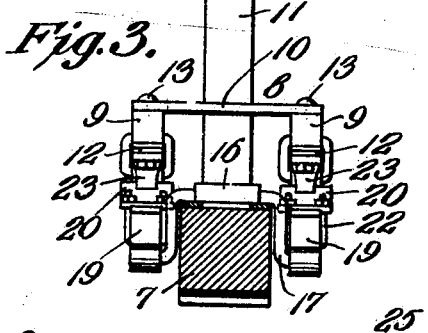
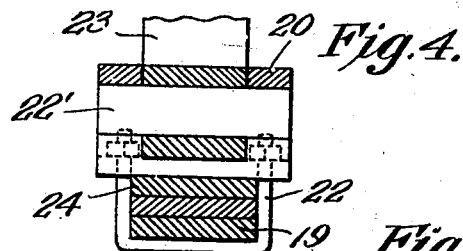
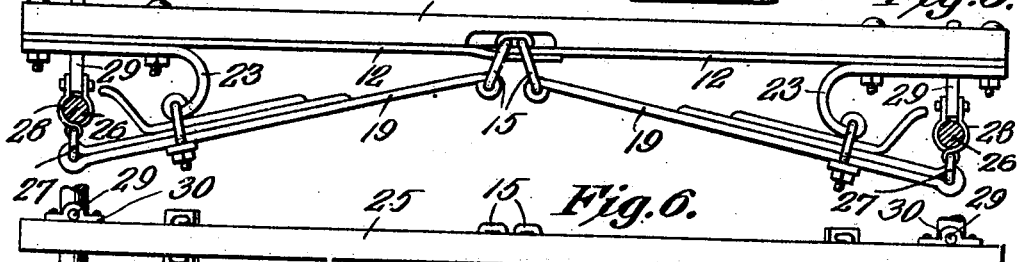
WITNESSES
James F. Crown
Dwight B. Lair
INVENTOR
Charles E. Burnett,
BY Richard B. Owen,
ATTORNEY

UNITED STATES PATENT OFFICE.

CHARLES E. BURNETT, OF NORTH ROSE, NEW YORK.

VEHICLE-BODY SUPPORT.

1,319,042.  Specification of Letters Patent.  Patented Oct. 21, 1919.

Application filed April 27, 1917. Serial No. 164,995.

*To all whom it may concern:*

Be it known that I, CHARLES E. BURNETT, a citizen of the United States, residing at North Rose, in the county of Wayne and State of New York, have invented certain new and useful Improvements in Vehicle-Body Supports, of which the following is a specification.

This invention relates to body supporting devices adapted particularly for use in connection with vehicles, and aims primarily to provide a simplified and improved mechanism whereby the wagon body may be at all times maintained in proper position parallel to the vehicle frame, irrespective of the fact that the weight within or upon the wagon body may not be evenly distributed.

A further object of the invention is to provide an equalizing and shock absorbing mechanism between the vehicle frame and the body therefor, which is constructed in such manner that an even elasticity is produced, even though the vehicle body may be subjected to an abnormal weight.

Still further objects reside in providing a mechanism of this character which is composed of relatively few simple and readily assembled parts, all of which are constructed and arranged in such manner as to minimize the opportunities for wear or breakage, which may be readily applied to or detached from the vehicle body, which eliminates the side thrusts of the vehicle body, and which will prove thoroughly efficient in the attainment of the various ends which it is designed to accomplish.

With these objects in view together with others which will appear as the description proceeds, the invention resides in the novel formation, combination, and arrangement of parts, all as will be described more fully hereinafter, illustrated in the drawings, and particularly pointed out in the claims.

In the drawings:—

Figure 1 is a front elevation of a conventional form of road wagon bolster, and illustrating the application of a wagon body support embodying the invention;

Fig. 2 is a top plan view of the device illustrated in Fig. 1;

Fig. 3 is a sectional view taken on line 3—3 of Fig. 1;

Fig. 4 is a sectional view taken on line 4—4 of Fig. 1;

Fig. 5 is a side elevation of a conventional form of chassis and vehicle frame of a motor vehicle, and illustrating the application of a mechanism constructed in accordance with the invention; and Fig. 6 is a plan view of the device shown in Fig. 6.

Referring now to the drawings, 7 indicates a bolster such as is employed upon the now generally used road wagons or trucks, to support the load of the vehicle.

Mounted above the bolster is a body supporting frame 8, which is adapted to support the vehicle load, and improved yieldable supporting mechanism is interposed between this supporting frame and the bolster 7. This supporting mechanism is arranged so that the load of the vehicle will be held with proper elasticity, and so that one side of the supporting frame can not be depressed or elevated a greater degree than the central portion or other side of the supporting frame. The frame in the present instance comprises a pair of bars 9 which may be formed of wood or angle iron, and which are connected at their ends by cross members or tie plates 10. These frame bars are arranged so as to straddle the bolster, and are of a length substantially equal to the distance between the stakes 11 at the extremities of the bolster.

Secured to the under faces of the bars 9 and extending longitudinally thereof are flat springs 12, bolts 13 being employed to hold the said springs at their outer ends to the frame bars. These springs overlap each other at their free or inner ends, and the uppermost of the said springs is looped as at 14 to retain a pair of shackles 15. It will be observed that this loop 14 is disposed midway the ends of the frame bars, and downward pull delivered to the shackles will be yieldably resisted by the springs 12. It will be also observed that laminated springs are employed beneath the supporting frame bars, so that great strength will be afforded the structure.

Mounted for rocking movement in suitable bearing plates 16 adjacent the ends of the bolster are stirrups 17. These stirrups are of substantially U-shape, and are inverted so as to straddle the bolster. The extremities of the downwardly extending legs of the stirrups constitute journals 18 for the outer ends of leaf or lever springs 19, the latter being pivotally secured at their innermost ends to the shackles 15 supported by the springs 12. It will be observed that these leaf or lever springs are also laminated, and a pair of these downwardly and outwardly divergent lever springs is provided for each of the frame bars 9.

Each of the lever springs has secured upon its upper surface and adjacent its outer end a fulcrum plate or keeper 20, the latter being held firmly upon their respective springs by the U-bolts 22. These keepers accommodate the bearing pins 22', to which are pivotally connected the downwardly extending ends of the fulcrum irons 23. These irons are secured to the extremities of the supporting frame bars 9 by the bolts 13. It will be observed that a relatively short flat spring leaf 24 is confined between each fulcrum plate and the lever spring 19, and the outer ends of these spring leaves are inclined upwardly as shown. It is obvious, therefore, that when the frame 8 has been depressed to such extent that the bars 9 thereof engage the upturned spring members 24, the latter will offer resistance to further downward movement of the said frame. An additional spring support for the frame is thus provided, and when the bars 9 engage with the ends of the spring leaf 24 a greater resisting power will be offered to the load on the vehicle body.

The bearing plates 16 for the stirrups rest upon the upper face of the bolster, and may or may not, as desired, be permanently secured thereto.

In operation, the weight or downward pressure upon the supporting frame intermediate its ends will be equally distributed through the flat springs 12 and lever spring 19 to the bolster. When weight is placed upon the body supporting frame beyond the medial portion thereof, the particular mechanism will so equalize or distribute the weight that the supporting frame will remain parallel to the wagon bolster. This equal distribution of weight is accomplished through the instrumentality of the fulcrums for the lever springs and particular method of mounting between the wagon supporting frame and the bolster. The weight delivered at one end of the frame will tend to depress that end, and this depression will lower the fulcrum of the adjacent lever spring. Lowering of the fulcrum will move the inner extremity of the lever spring downwardly, whereupon the inner ends of the flat springs 12 upon the under surface of the frame bars will be lowered and as both shackles 15 for the lever spring ends will move in unison, the fulcrum for the lever spring at the opposite end of the frame will be lowered a distance equal to the degree of downward movement of the first mentioned fulcrum. In this manner it is seen that the weight is evenly distributed, whereby depression of one side of the body of the vehicle is obviated, and as the levers 19 and members 12 are highly elastic, the wagon body supporting frame is at all times yieldably supported.

In Figs. 5 and 6 there is illustrated a slightly modified form of the invention, and wherein the general idea above detailed is rendered applicable to the body of the motor vehicle. In this form of the invention, 25 indicates the vehicle frame, and 26 the supporting axles therefor. Secured to the under surface of the longitudinal members of the body supporting frame are the flat springs 12, arranged in a manner identical to the corresponding springs on the supporting frame 8 above detailed. These springs are provided at their overlapping ends with the shackles 15, to which the inner ends of the downwardly and outwardly converging lever or leaf springs 19 are pivoted. These levers are pivoted as at 27 to collars 28 bolted to the front and rear axles of the vehicle. The fulcrum irons 23 are secured to the vehicle frame, and are fulcrumed to the lever springs in the manner explained above.

To obviate the possibility of movement of the axles toward or away from each other, each axle is provided with an upwardly extending pin 29, the latter being preferably rigidly secured to the collars 28, and these pins slide within bearing plates 30 secured upon the body frame 25. It is thus seen that the axles are held against movement toward or away from each other, but are capable of moving vertically.

From this description, it is obvious that there has been provided an equalizing mechanism which will operate efficiently to perform the various objects set forth, and danger of breakage or derangement of the parts is exceedingly remote. The various levers and springs are so associated with each other that the weight subjected to the vertically movable frame or body is distributed evenly to the running frame of the vehicle.

While the present disclosure is that of what is believed to be the preferred embodiment of the invention, it is to be understood that the invention is not necessarily limited to the structure shown, but that various changes in the minor details of construction, arrangement, and proportion of parts may be made without departing from the spirit of the invention as defined in the appended claims.

What is claimed is:—

1. The combination with a vehicle frame of a body, a lever disposed beneath said body and fulcrumed intermediate its ends to the body, the said lever being pivoted to said body and frame at its inner and outer ends respectively, and a spring secured to the lever intermediate the fulcrum and its outer connection and adapted to engage said body as the same moves downward.

2. The combination with a vehicle frame of a body, a lever disposed beneath said body and fulcrumed intermediate its ends to the body, the said lever being pivoted to said body and frame at its inner and outer ends respectively, and an upwardly inclined leaf spring secured to the lever intermediate the fulcrum and its outer connection and adapted to engage said body as the same moves downward.

3. The combination with a vehicle frame of a body, an angularly disposed lever beneath said body and fulcrumed intermediate its ends to the body, the said lever being pivoted to said body and frame at its inner and outer ends respectively, and a spring secured to the lever intermediate the fulcrum and its outer connection and adapted to engage said body as the same moves downward.

4. The combination with a vehicle frame of a body, a rocking member on said frame, a lever disposed beneath said body and fulcrumed intermediate its ends to the body, the said lever being pivoted to said body and said rocking member at its inner and outer ends respectively, and an upwardly extending spring secured to the lever intermediate the fulcrum and its outer connection and adapted to engage said body as the same moves downward.

5. The combination with a vehicle frame of a body, rocking members on said frame, and a pair of flat springs secured at their outer ends to said body and having their inner ends overlapping, such springs normally lying against the under face of said body, a pair of leaf springs disposed between said first named springs and said frame and fulcrumed intermediate their ends to said body, said leaf springs being pivoted at their inner ends to said first named springs and extending outwardly and downwardly therefrom with their outer ends pivoted to said rocking members.

6. The combination with a vehicle frame of a body, rocking members on said frame, a pair of flat springs secured at their outer ends to said body and having their inner ends overlapping, retaining means carried by the uppermost of the overlapping inner ends of the said springs, a pair of leaf springs disposed between said first named springs and said frame and fulcrumed intermediate their ends to said body, and shackles engaging through said retaining means, said leaf springs being pivoted at their inner ends to said shackles and extending outwardly and downwardly therefrom with their outer ends pivoted to said rocking members.

7. In a device of the class described, a bolster, stirrups straddling said bolster adjacent its ends and being capable of rocking toward and away from each other, a body supporting frame disposed above and parallel with said bolster, the said frame including a pair of spaced parallel longitudinal bars, springs secured to said bars intermediate the ends thereof; a pair of leaf springs disposed between each bar and said bolster, said springs being pivoted at their inner ends to said bar springs and extending outwardly and downwardly therefrom, the outer ends of said leaf springs being pivoted to said stirrups, and the said leaf springs being fulcrumed adjacent their outer ends to said supporting frame bars; and an upwardly extending spring carried by each of said leaf springs intermediate its fulcrum and its outer connection, the said upwardly extending springs being adapted to be engaged by said body when the same moves downward.

In testimony whereof I affix my signature in presence of two witnesses.

CHARLES E. BURNETT.

Witnesses:
HARRY QUEREAU,
SETH C. OAKS.

Copies of this patent may be obtained for five cents each, by addressing the "Commissioner of Patents, Washington, D. C."